UNITED STATES PATENT OFFICE.

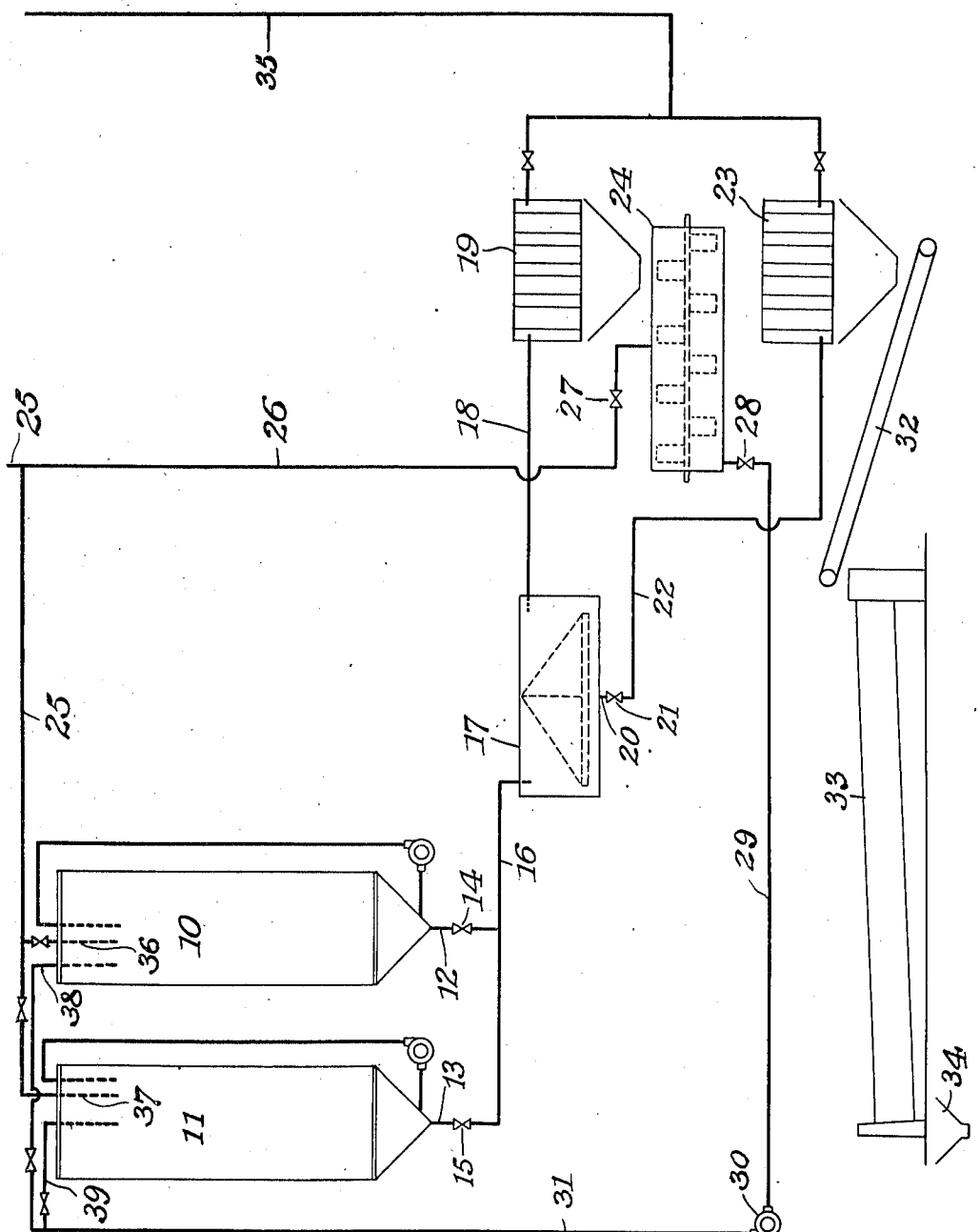

RALPH S. SHERWIN, OF EAST ST. LOUIS, ILLINOIS, ASSIGNOR TO ALUMINUM COMPANY OF AMERICA, OF PITTSBURGH, PENNSYLVANIA, A CORPORATION OF PENNSYLVANIA.

PROCESS FOR PRODUCING ALUMINUM OXID.

1,314,710.   Specification of Letters Patent.   Patented Sept. 2, 1919.

Application filed October 20, 1917, Serial No. 197,593. Renewed December 7, 1918. Serial No. 265,788.

*To all whom it may concern:*

Be it known that I, RALPH S. SHERWIN, a citizen of the United States, residing at East St. Louis, county of St. Clair, and State of Illinois, have invented certain new and useful Improvements in Processes for Producing Aluminum Oxid, of which the following is a full, clear, and exact description.

According to present practice the production of aluminum oxid from bauxite consists essentially in dissolving the alumina in caustic soda and precipitating it from the solution by contact with freshly precipitated aluminum hydrate.

My invention, which constitutes the subject matter of this application, relates to an improved method which not only facilitates the precipitation of aluminum hydrate but results in the production of particles or grains of hydrate which are uniformly coarse. The precipitate, produced by the methods now in vogue, consists largely and sometimes wholly of very fine particles. The large proportion of fine particles not only makes the precipitate difficult to filter and wash but also causes the loss of a considerable portion of the aluminum oxid as a fine dust during the calcination and subsequent handling and makes conditions quite disagreeable for the workmen employed in calcining and handling it. My invention, forming the subject of this application, therefore relates to improvements in the method for the manufacture of aluminum oxid designed to overcome the difficulties just referred to.

Referring to the drawing which illustrates diagrammatically one form of apparatus for carrying out the process, the reference numerals 10 and 11 designate two precipitating tanks of the form now in vogue, provided with outlets 12 and 13, having suitable valves 14 and 15 respectively. The aluminate solution in the precipitator tanks is circulated, carrying aluminum hydrate in suspension, in the manner described in the Fickes Patent No. 13,668, reissued Jan. 6, 1914, and in the manner described in my copending application, Serial No. 779,327, filed July 16, 1913 (now Patent No. 1,251,296, December 25, 1917). When the precipitation say in tank 10, is as nearly complete as is practicable commercially the solution with the precipitated aluminum hydrate is drawn out through the valve 14 and the pipe line 16 into a continuous settling tank 17, similar to the device known as the Dorr thickener. As a portion of the precipitated aluminum hydrate is too fine to settle readily in the thickener the overflow therefrom is not clear but contains the finer portion of the precipitate. The finer portion, amounting perhaps to ten per cent. (10%) of the precipitated aluminum hydrate, together with the main portion of the solution, amounting perhaps to ninety per cent. (90%) of the total solution, passes through the upper outlet of the tank 17, through the pipe line 18, to any suitable form of filter or filter press 19. The coarser portion of the precipitated aluminum hydrate, amounting perhaps to ninety per cent. (90%) of the whole precipitate, together with the smaller portion of the solution amounting to ten per cent. (10%) or less of the total, passes out through the outlet 20 of the settling tank, through valve 21, pipe line 22 to the filter 23 or to other suitable means of separating the aluminum hydrate from the solution and washing it with clear solution or with water.

When a sufficient amount of the fine portion of the precipitate is collected in the filter 19, filtration is stopped and the filter cake, consisting of fine aluminum hydrate, is dropped into a tank 24, containing any suitable form of agitator. Fresh sodium aluminate solution is introduced into the tank 24 through the pipe 25, branch pipe 26, and valve 27. The liquor and fine aluminum hydrate are then mixed by means of agitators or paddles so as to hold the fine aluminum hydrate particles in suspension. After sufficient agitation the mixture is drawn through the valve 28 and the pipe line 29 and pump 30 and pipe 31 and forced by the pump into the precipitator tank 10, or any other precipitator tank in the group, which contains fresh sodium aluminate liquor from which aluminum hydrate is to be precipitated.

The coarse portion of the precipitated aluminum hydrate in the filter 23 is washed and dropped into a suitable conveyer 32, which carries it to the rotary kiln 33, in which it is heated to drive off the combined water and from which it is dropped into a hopper 34 and conveyed to any suitable point. The solution passed through the filter 19 is mixed in the pipe 35 with the solution passed through the filter 23. From the pipe 35 the solution is returned to the digesters and again saturated with the aluminum hydrate in solution.

The pipe 25 is the main filling line for the supply of liquor saturated with aluminum hydrate in solution to the tanks 10 and 11, and the numerals 36 and 37 designate branch pipes for discharging this liquor into tanks 10 and 11 respectively. The pipe 31 is likewise provided with branch pipes 38 and 39. For the sake of brevity and clearness I have illustrated the parts diagrammatically and have shown the invention in use with two precipitators. It is to be understood, however, that any number of precipitator tanks may be employed in connection with a single thickener and with any suitable number of filters. The thickener, of course, should be of a size suitable for the number of precipitators with which it is connected, and the capacity of the filters should be suitable for the number of precipitators in the system.

As clearly described in his patent above referred to, Fickes discovered that the precipitation of aluminum hydrate is due to the presence of the precipitate in the form of hydrate particles in suspension in the aluminate liquor, thereby exploding the commonly accepted notion or theory that the precipitation of aluminate hydrate was effected by agitation, more or less violent. In practising his method in the preferred manner, the necessary suspension of the particles in the liquor is effected by frequently or continuously withdrawing the precipitate from the bottom of the tank in which the precipitation occurs and delivering it to the liquor at or near the top. In this way all portions of the liquor are made to contain sufficient hydrate in the form of small particles to maintain the precipitation at an effective rate. In the precipitation of aluminum hydrate in this fashion, no attempt, as far as I am aware, has been made to separate the particles or grains of different size. If my separation does accidentally occur a larger proportion of the coarser material is returned to the precipitators leaving the finer materials to be washed and calcined. I have ascertained, however, that by introducing into the liquor only the finer particles of aluminum hydrate to start precipitation the necessary suspension of the particles is more easily maintained; and an additional advantage flowing from this method is the fact that it enables the finer particles or grains of aluminum hydrate to increase in size so that little or no dust will be formed during calcination to produce the oxid. And the manufacture of aluminum from an oxid containing little or no dust is very desirable since it requires less power to produce the same amount of aluminum than when using aluminum oxid containing a large proportion of fine particles.

The apparatus described and illustrated herein is claimed in my co-pending case, Serial No. 197,594, filed October 20, 1917 (renewed November 23, 1918, Serial No. 263,939).

What I claim is:

1. A method of precipitating aluminum hydrate from an alkali metal aluminate solution, comprising the steps of maintaining a column of the alkali metal aluminate solution, separating the finer from the coarser particles of already precipitated hydrate, and introducing the finer particles at the top thereof to start precipitation, whereby the suspension of the particles of hydrate in the aluminate solution is more effectively maintained.

2. The method of producing aluminum hydrate from an alkali metal aluminate solution which consists in precipitating aluminum hydrate, separating the finer from the coarser grains and introducing only the finer grains into fresh portions of sodium aluminate solution to start precipitation.

3. The method of producing only coarse grains of aluminum hydrate from an alkali metal aluminate solution which consists in precipitating a quantity of aluminum hydrate in the usual way, separating the finer from the coarser particles of hydrate, and introducing only the finer particles in the fresh portions of the aluminate solution to start precipitation.

4. The method of precipitating aluminum hydrate which consists in precipitating a quantity of aluminum hydrate from a column of an alkali metal aluminate solution, withdrawing the solution with the precipitated aluminum hydrate, separating the finer from the coarser particles of the hydrate, and returning only the finer particles to fresh portions of the aluminate solution.

5. The method of precipitating aluminum hydrate from an alkali metal aluminate solution, which consists in separating the finer from the coarser particles of already precipitated aluminum hydrate, introducing the finer particles into a column of fresh aluminate solution to start precipitation, then precipitating the same in the usual way.

6. The method of producing only coarse grains of aluminum hydrate from an alkali metal aluminate solution, which comprises the steps of separating the finer from the coarser particles of already precipitated hydrate, and returning the finer particles only to fresh portions of aluminate solution.

7. The method of producing only coarse grains of aluminum hydrate from an alkali metal aluminate solution, which consists in separating the finer from the coarser particles of already precipitated aluminum hydrate, returning the finer particles only to fresh portions of the aluminate solution to start precipitation, and then precipitating in the usual way.

8. In the precipitation of aluminum hydrate from alkali metal aluminate liquor by maintaining precipitated aluminum hydrate in suspension in such liquor, the step of introducing only the finer particles of already precipitated aluminum hydrate into the aluminate liquor to start precipitation, thereby producing more rapid precipitation and causing the finer particles to increase in size.

9. A process of producing relatively coarse aluminum hydrate from alkali metal aluminate solution, comprising adding finely divided precipitated aluminum hydrate to such solution, maintaining the said hydrate in suspension in such solution to produce a liquor containing both coarse and fine precipitated aluminum hydrate, drawing off such liquor containing such precipitate, separating the same into two portions, viz: a large portion of the solution containing the principal part of the fine aluminum hydrate, and a small portion of the solution containing the principal part of the coarse aluminum hydrate, separately filter-pressing both of such fractions, mixing the fine precipitate with aluminate solution and returning the mixture to the precipitation stage of the process.

In testimony whereof I hereunto affix my signature.

RALPH S. SHERWIN.